United States Patent

Murakami et al.

[11] 3,946,624
[45] Mar. 30, 1976

[54] SPEED CHANGE GEAR

[75] Inventors: Noboru Murakami, Nagoya; Koichiro Hirosawa, Kariya; Kazuo Ohara; Koichi Matsuo, both of Toyota, all of Japan

[73] Assignee: Aisin Seiki Kabushiki Kaisha, Japan

[22] Filed: Feb. 7, 1974

[21] Appl. No.: 440,544

[30] Foreign Application Priority Data
Feb. 26, 1973 Japan.............................. 48-22830
May 22, 1973 Japan.............................. 48-57372

[52] U.S. Cl. ...................... 74/769; 74/768; 74/753
[51] Int. Cl.² ...................... F16H 57/10; F16H 3/44
[58] Field of Search................... 74/768, 769, 753

[56] References Cited
UNITED STATES PATENTS

| 3,410,157 | 11/1968 | Livezey........................... 74/764 X |
| 3,507,168 | 4/1970 | Carp ............................. 74/765 X |
| 3,701,293 | 10/1972 | Mori et al. ..................... 74/763 X |
| 3,713,354 | 1/1973 | Edmunds ......................... 74/753 X |
| 3,722,323 | 3/1973 | Welch............................. 74/769 X |
| 3,820,418 | 6/1974 | Ott................................ 74/763 X |

FOREIGN PATENTS OR APPLICATIONS
1,906,030  8/1970  Germany .............................. 74/753

Primary Examiner—Benjamin W. Wyche
Assistant Examiner—P. S. Lall
Attorney, Agent, or Firm—Oblon, Fisher, Spivak, McClelland & Maier

[57] ABSTRACT

A speed change gear system of the planetary type suited for applications to fluid couplings utilized upon automotive vehicles includes at least first, second, and third planetary gear sets suitably interposed between an input shaft and an output shaft, first and second clutches, and first, second, and third braking means. The first planetary gear set may include a first sun gear, a first planetary gear engaged therewith, a second planetary gear engaged with the first planetary gear, a first ring gear enmeshed with the second planetary gear, and a first carrier rotatably supporting the first and second planetary gears, while the second planetary gear set may include a second sun gear drivingly coupled to the first carrier, a third planetary gear engaged with the second sun gear, a second ring gear enmeshed with the third planetary gear, and a second carrier rotatably supporting the third planetary gear, and the third planetary gear set may include a third sun gear drivingly coupled to the first sun gear and the second ring gear, a fourth planetary gear interengaged with the third sun gear, a third ring gear enmeshed with the fourth planetary gear, and a third carrier rotatably supporting the fourth planetary gear and drivingly coupled to the second carrier and to the output shaft. The first clutch couples or uncouples the input shaft to or from the first sun gear, the second ring gear and the third sun gear, while the second clutch couples or uncouples the input shaft to or from the first carrier and the second sun gear. The first brake is capable of locking the first carrier and the second sun gear to the gear casing while the second brake is capable of locking the first ring gear to the casing and the third brake is capable of locking the third ring gear to the casing.

1 Claim, 10 Drawing Figures

SPEED CHANGE GEAR

BACKGROUND OF THE INVENTION

1. Field of the Invention

The present invention relates generally to speed change gears and more particularly to speed change gears suited for application within fluid couplings or torque converters utilized upon motor vehicles, especially automobiles.

2. Description of the Prior Art

It is desirable that the auxiliary speed changer of the gear type within automatic transmissions utilized upon large automotive vehicles, such as for example, trucks and buses, should have at least four speed shifts. This speed change mechanism may be realized by suitably combining three, four, or even more, sets of simple, single-pinion or double-pinion type planetary gear sets. The combination of these gears may be widely varied, but within any combination, the following conditions are desired to be satisfied:

1. The output shaft should be coupled to the same elements within each speed range.
2. In order to reduce the circumferential speed of the bearing of each element of the planetary gear set, the number of its revolutions should be small.
3. The tooth load, i.e., tangential force, of each element should be small so as to maintain the strength of the gear teeth.
4. The gear set should meet meshing conditions for the number of teeth. The sun gear, whose diameter is to be minimized, as well as each planetary pinion gear, should have the necessary number of teeth.
5. Within the planetary gear set, the coupling relationship among the elements should be simple and the distance from each other be small.
6. During speed shifts wherein frictional coupling means are utilized during forward drive, such speed shifts should be available through one coupling means alone.

Present speed change gear systems do not satisfactorily attain all of the above-noted conditions with the requisite efficiency.

SUMMARY OF THE INVENTION

Accordingly, it is an object of the present invention to provide an efficient speed change gear system which provides at least four speed ranges for forward drive and one speed range for reverse by the use of a plurality of simple, planetary gear sets of the single pinion type and of the double pinion type.

BRIEF DESCRIPTION OF THE DRAWINGS

Various other objects, features and attendant advantages of the present invention will be more fully appreciated as the same becomes better understood from the following detailed description when considered in conjunction with the accompanying drawings, in which like reference characters designate like or corresponding parts throughout the several views, and wherein.

DESCRIPTION OF THE PREFERRED EMBODIMENTS

Figure 1:
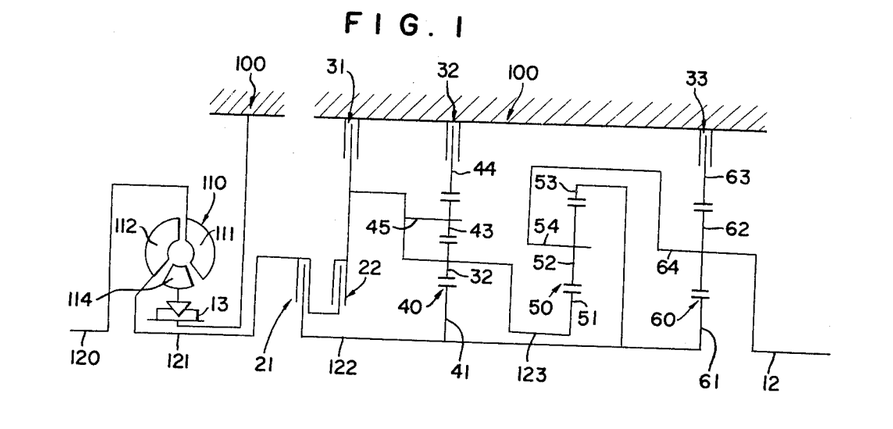
FIG. 1 is a schematic view of one embodiment of a speed change gear system constructed according to the present invention and showing its cooperative parts.

Referring now to the drawings and more particularly to FIG. 1 thereof, a three-element, one-stage, two-phase torque converter, generally indicated by the reference character 110, includes a pump impeller 111 connected to an input shaft 120, a turbine runner 112 connected to a first intermediate shaft 121, and a stator wheel 114 maintained relative to a casing 100 by means of a one-way brake 13. A first clutch 21 is coaxially interposed between the first intermediate shaft 121 and a second intermediate shaft 122 so as to permit the two intermediate shafts 121 and 122 to be coupled and uncoupled, and a hollow third intermediate shaft 123 is coaxially mounted upon the second intermediate shaft 122.

A first sun gear 41 and a third sun gear 61 provided as components of a first planetary gear set, generally indicated by the reference character 40, of the double pinion type, and of a third planetary gear set, generally indicated by the reference character 60, of the single pinion type, respectively, are fastened upon the second intermediate shaft 122 by spline means or the like whereby these sun gears can rotate along with the second intermediate shaft 122. The first planetary gear set 40 also includes a first planetary gear 42 engaged with the first sun gear 41, a second planetary gear 43 engaged with the first planetary gear 42, a first ring gear 44 engaged with the second planetary gear 43, and a first carrier 45 rotatably supporting the planetary gears 42 and 43. A second clutch 22 is interposed between the first carrier 45 and the first intermediate shaft 121 and is disposed in succession with the first clutch 21 whereby the first carrier 45 and the first intermediate shaft 121 are able to be coupled or uncoupled. A first brake 31 is installed between the first carrier 45 and the casing 100, and when this brake is actuated, the first carrier 45 is rotatably locked, carrier 45 also being integrally fastened with the third intermediate shaft 123. A second brake 32 is similarly installed between the first ring gear 44 and the casing 100, and when this brake is actuated, the first ring gear 44 is rotatably locked.

A second planetary gear set, generally indicated by the reference character 50, of the single pinion type, is disposed adjacent the first planetary gear 40 and includes a second sun gear 51 rotatable with the third intermediate shaft 123, a third planetary gear 52 engaged with the second sun gear 51, a second ring gear 53 engaged with the third planetary gear 52, and a second carrier 54 rotatably supporting the third planetary gear 52, the second ring gear 53 being integrally fastened with the second intermediate shaft 122. The third planetary gear set 60 is disposed adjacent the second planetary gear set 50 and is seen to similarly include a third sun gear 61 disposed upon the end section of the second intermediate shaft 122, a fourth planetary gear 62 engaged with the third sun gear 61, a third ring gear 63 engaged with the fourth planetary gear 62, and a third carrier 64 rotatably supporting the fourth planetary gear 62. A third brake 33 is installed between the third ring gear 63 and the casing 100 and when this brake is actuated, the third ring gear 63 is locked with respect thereto. The third carrier 64 is integrally coupled to the second carrier 54 and also to the output shaft 12, which is disposed coaxially with and serially behind the second intermediate shaft 122.

The following Table I discloses the gear ratios accompanying the individual speed ranges, four forward speed ranges and two reverse speed ranges, in connection with the operation of the clutches 21 and 22 as well as the brakes 31, 32 and 33:

TABLE 1

| Speed Ranges | 21 | 22 | 31 | 32 | 33 | Gear Ratios |
|---|---|---|---|---|---|---|
| First speed | 0 | | | | 0 | $1:1+\frac{1}{I_3}$ |
| Second speed | 0 | | | 0 | | $1:\frac{(1+I_2)(1-I_1)}{1-I_1-I_2}$ |
| Third speed | 0 | | 0 | | | $1:1+I_2$ |
| Fourth speed | 0 | 0 | | | | $1:1.0$ |
| Reverse 1st speed | | 0 | | | 0 | $1:-\left(\frac{I_1+I_1I_2}{1-I_1-I_1I_2}\right)$ |
| Reverse 2nd speed | | 0 | | 0 | | $1:-\left(\frac{1}{I_2I_3}-1\right)$ |

Within the above Table I, the reference I denotes the radial ratio of the gear used, which is calculated from the following formula: For the single pinion type gear set:

$$N_{Rn} - (1+I_n)N_{Cn} + I_n N_{Sn} = 0 \quad (n: 1, 2, 3, \ldots)$$

For the double pinion type gear set:

$$N_{Rn} - (1 - I_n)N_{Cn} - I_n N_{Sn} = 0 \quad (n: 1, 2, 3, \ldots)$$

wherein $N_{Rn}$ = the number of revolutions of the ring gear
$N_{Cn}$ = the number of revolutions of the carrier
$N_{Sn}$ = the number of revolutions of the sun gear In this embodiment, for example, $I_1 = 0.36$, $I_2 = 0.52$ and $I_3 = 0.36$ for the individual speed ranges. The gear ratios are then as follows:

Forward

First speed: $1:1+\frac{1}{I_3} = 1:3.778$

Second speed: $1:\frac{(1+I_2)(1-I_1)}{1-I_1-I_1I_2} = 1:2.148$

Third speed: $1:1+I_2 = 1:1.52$

Fourth speed: $1:1.0 = 1:1.0$

Reverse

First speed: $1:-\left(\frac{I_1+I_1I_2}{1-I_1-I_1I_2}\right) = 1:-1.208$

Second speed: $1:-\left(\frac{1}{I_2I_3}-1\right) = 1:-4.342$

According to the present invention, as has been described above, four forward speed ranges and two reverse speed ranges can readily be realized by utilization of two simple planetary gear sets of the single opinion type and one simple planetary gear set of the double pinion type.

Figure 2:
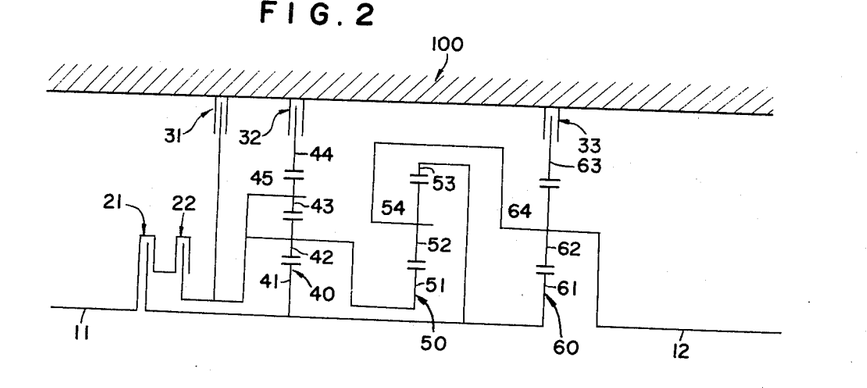
FIG. 2 is a view similar to that of FIG. 1 showing however a second embodiment of a speed change gear system of the present invention.

Referring now to FIG. 2, there is schematically shown a second embodiment of the present invention wherein the gearing system is seen to include an input shaft 11 and an output shaft 12, and first planetary gear set, generally inidcated by the reference character 40, of the double pinion type, a second planetary gear set, generally indicated by the reference character 50, of the single pinion type, and a third planetary gear set, generally indicated by the reference character 60, of the single pinion type being suitably interposed between the input shaft 11 and the output shaft 12.

The first planetary gear set 40 includes a first sun gear 41, a first planetary gear 42 engaged with the first sun gear 41, a second planetary gear 43 engaged with the first planetary gear 42, a first ring gear 44 engaged with the second planetary gear 43, and a first carrier 45 rotatably supporting the first and second planetary gears 42 and 43. The second planetary gear set 50 similarly includes a second sun gear 51 drivingly coupled to the first carrier 45, a third planetary gear 52 engaged with the second sun gear 51, a second ring gear 53 engaged with the third planetary gear 52, and a second carrier 54 rotatably supporting the third planetary gear 52. The third planetary gear set 60 likewise includes a third sun gear 61 drivingly coupled to the first sun gear 41 and to the second ring gear 53, a fourth planetary gear 62 engaged with the third sun gear 61, a third ring gear 63 engaged with the fourth planetary gear 62, and a third carrier 64 drivingly coupled to the second carrier 54 and to the output shaft 12 and rotatably supporting the fourth planetary gear 62.

A first clutch 21 serves to couple or uncouple the input shaft 11 to or from the first sun gear 41, the second ring gear 53 and the third sun gear 61, while a second clutch 22 similarly serves to couple or uncoupld the input shaft 11 to or from the first carrier 45 and the second sun gear 51. A first brake 31 is disposed so as to be capable of locking the first carrier 45 and the second sun gear 51 with respect to the casing 100, while a second brake 32 is disposed so as to be capable of locking the first ring gear 44 with respect to the casing 100, and a third brake 33 is disposed so as to be capable of locking the third ring gear 63 with respect to the casing 100.

The following conditions hold for the planetary gear sets of the speed change gear system of the present invention:

Single Pinion Type:

$$N_{Rn} - (1 + I_n) N_{Cn} + I_n N_{Sn} = 0 \quad (n = 1, 2, 3, \ldots)$$

Double Pinion Type:

$$N_{Rn} - (1 - I_n) N_{Cn} - I_n N_{Sn} = 0 \quad (n : 1, 2, 3, \ldots)$$

wherein $N_{Rn}$ = the number of revolutions of the ring gear
$N_{Cn}$ = the number of revolutions of the carrier
$N_{Sn}$ = the number of revolutions of the sun gear In this embodiment, the radial ratios in each speed range are: $I_1 = 0.360$, $I_2 = 0.520$, and $I_3 = 0.360$. Table 1a shows in summary the gear ratios accompanying the individual speed ranges, four forward speed ranges and two reverse speed ranges, in connection with the operation of clutches 21 and 22 as well as brakes 31, 32 and 33.

TABLE Ia

| Speed Ranges | 21 | 22 | 31 | 32 | 33 | Gear Ratios |
|---|---|---|---|---|---|---|
| First speed | 0 | | | | 0 | 1 : 3.78 |
| Second speed | 0 | | | 0 | | 1 : 2.15 |
| Third speed | 0 | | 0 | | | 1 : 1.52 |
| Fourth speed | 0 | 0 | | | | 1 : 1.00 |
| Reverse 1st speed | | 0 | | | 0 | 1 : −4.34 |
| Reverse 2nd speed | | 0 | | 0 | | 1 : −1.21 |

In addition, Table 1B shows the relationship regarding the number of revolutions and the tangential force of each element of the planetary gear set within each speed range. The ratio of the number of revolutions is based upon the assumption that the number of revolutions of the input shaft is 1, while the tangential forces are based upon the assumption that the input shaft torque exerted upon the ring gear is 1. These assumptions will prevail throughout all of the embodiments of the present invention as hereinafter described.

$C_n$ = the carrier gears
$RG_n$ = the ring gears
$P_n$ = the planetary gears

Within the fifth forward speed range of Table 7b, because the reduction gear ratio is 1: 1.00, the number of revolutions N of each sun gear, ring gear and carrier gear is 1.00 and the number of revolutions N of each planetary gear is 0.00, while the tangential force W thereof is considerably less than that produced within other speed ranges. More specifically, within the fifth forward speed range, at least two clutches establish coupling, through which the torque of the input shaft is distributed to the individual elements, as opposed to the mode of operation within the other speed ranges wherein any one of the clutches establishes the coupling through which the torque of the input shaft is distributed to the individual elements. In other words, the tangential force of each element is less within the fifth forward speed range than in the other speed ranges. For explanatory simplicity, therefore, the number of revolutions N and the tangential force W within the speed range where the reduction gear ratio 1.00 will be omitted throughout the embodiments of the present invention as hereinafter described.

Figure 3:
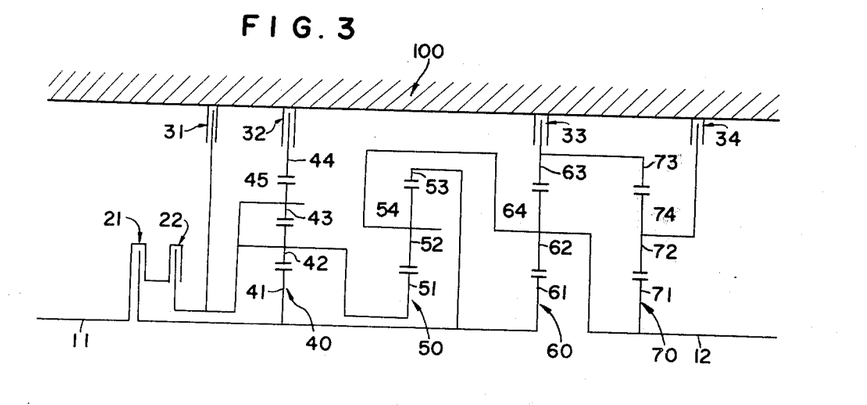
FIG. 3 is a view similar to that of FIG. 1 showing however a third embodiment of a speed change gear system of the present invention.

Referring now to FIG. 3, there is schematically shown a third embodiment of the present invention wherein an input shaft 11 and an output shaft 12 have interposed therebetween a first planetary gear set, generally indicated by the reference character 40, of the double pinion type, and second, third and fourth planetary gear sets, generally indicated by the reference characters 50, 60 and 70, of the single pinion type.

The first planetary gear set 40 comprises a first sun gear 41, a first planetary gear 42 engaged with the first sun gear 41, a second planetary gear 43 engaged with the first planetary gear 42, a first ring gear 44 engaged with the second planetary gear 43, and a first carrier 45 rotatably supporting the first and second planetary gears 42 and 43. The second planetary gear set 50 similarly comprises a second sun gear 51 drivingly coupled to the first carrier 45, a third planetary gear 52 engaged with the second sun gear 51, a second ring gear 53 engaged with the third planetary gear 52, and a second carrier 54 rotatably supporting the third plane-

TABLE 1B

| A | B | X1 | | | | | X2 | | | | X3 | | |
|---|---|---|---|---|---|---|---|---|---|---|---|---|---|
| | | S1 | C1 | RG1 | P1 | P2 | S2 | C2 | RG2 | P3 | S3 | C2 | RG3 | P4 |
| F1 | N | 1.00 | −1.15 | −0.38 | −2.54 | 2.54 | −1.15 | 0.26 | 1.00 | 3.06 | 1.00 | 0.26 | 0.0 | −0.83 |
| | W | 0.0 | 0.0 | 0.0 | 0.0 | 0.0 | 0.0 | 0.00 | 0.00 | 0.00 | 2.78 | 5.56 | 2.78 | 2.78 |
| F2 | N | 1.00 | −0.56 | 0.0 | −1.85 | 1.85 | −0.56 | 0.47 | 1.00 | 2.23 | 1.00 | 0.47 | 0.27 | −0.60 |
| | W | 1.15 | 2.30 | 1.15 | 1.15 | 1.15 | 1.41 | 2.83 | 1.41 | 1.41 | 0.00 | 0.0 | 0.0 | 0.0 |
| F3 | N | 1.00 | 0.0 | 0.36 | −1.18 | 1.18 | 0.0 | 0.66 | 1.00 | 1.43 | 1.00 | 0.66 | 0.53 | −0.38 |
| | W | 0.0 | 0.0 | 0.0 | 0.0 | 0.0 | 1.00 | 2.00 | 1.00 | 1.00 | 0.00 | 0.0 | 0.0 | 0.0 |
| R1 | N | −0.87 | 1.00 | 0.33 | 2.21 | −2.21 | 1.00 | −0.23 | −0.87 | −2.67 | −0.87 | −0.23 | 0.0 | 0.72 |
| | W | 0.0 | 0.0 | 0.0 | 0.0 | 0.0 | 1.92 | 3.85 | 1.92 | 1.92 | 5.34 | 10.63 | 5.34 | 5.34 |
| R2 | N | −1.78 | 1.00 | 0.0 | 3.28 | −3.28 | 1.00 | −0.83 | −1.78 | −3.96 | −1.73 | −0.83 | −0.49 | 1.07 |
| | W | 2.21 | 4.42 | 2.21 | 2.21 | 2.21 | 0.80 | 1.59 | 0.80 | 0.80 | 0.00 | 0.0 | 0.0 | 0.0 |

Symbols utilized within Tables 1B – 9B are summarized hereinbelow:
A = the speed range
B = the planetary gear set
N = the number of revolutions
W = the tangential force
$F_n$ = the forward speeds
$R_n$ = the reverse speeds
$X_n$ = the planetary gear sets
$S_n$ = the sun gears tary gear 52.

The third planetary gear set 60 comprises a third sun gear 61 drivingly coupled to the first sun gear 41 and to the second ring gear 53, a fourth planetary gear 62 engaged with the third sun gear 61, a third ring gear 63 engaged with the fourth planetary gear 62, and a third carrier 64 rotatably supporting the fourth planetary gear 62, while the fourth planetary gear set 70 comprises a fourth sun gear 71 drivingly coupled to the second and third carriers 54 and 64 and to the output shaft 12, a fifth planetary gear 72 engaged with the fourth sun gear 71, a fourth ring gear 73 drivingly coupled to the third ring gear 63 and engaged with the fifth planetary gear 72, and a fourth carrier 74 rotatably supporting the fifth planetary gear 72.

A first clutch 21 is disposed so as to be capable of coupling or uncoupling the input shaft 11 to or from the first sun gear 41, the second ring gear 53 and the third sun gear 61 while a second clutch 22 is disposed so as to be capable of coupling or uncoupling the input shaft 11 to or from the first carrier 45 and the second sun gear 51. A first brake 31 is disposed so as to be capable of locking the first carrier 45 and the second sun gear 51 relative to the casing 100 while a second brake 32 is likewise disposed so as to be capable of locking the first ring gear 44 relative to the casing 100. A third brake 33 is also provided so as to be capable of locking the third ring gear 63 and the fourth ring gear 73 relative to the casing 100 while still a fourth brake 34 is provided so as to be capable of locking the fourth carrier 74 relative to the casing 100.

Within this third embodiment, the radial ratios within each speed range are: $I_1 = 0.360$, $I_2 = 0.520$, $I_3 = 0.360$ and $I_4 = 0.562$, and Table 2a shows the gear ratios within the individual speed ranges, five forward speed ranges and three reverse ranges, in connection with the operation of clutches 21 and 22, as well as brakes 31, 32, 33 and 34. Table 2b also shows the relationship regarding the number of revolutions and the tangential force of each element of the planetary gear set within each speed range.

TABLE 2a

| Speed Ranges | 21 | 22 | 31 | 32 | 33 | 34 | Gear Ratios |
|---|---|---|---|---|---|---|---|
| First speed | 0 | | | | | 0 | 1 : 5.34 |
| Second speed | 0 | | | | 0 | | 1 : 3.78 |
| Third speed | 0 | | | 0 | | | 1 : 2.15 |
| Fourth speed | 0 | | 0 | | | | 1 : 1.52 |
| Fifth speed | 0 | 0 | | | | | 1 : 1.00 |
| Reverse 1st speed | | 0 | | | | 0 | 1 : −7.34 |
| Reverse 2nd speed | | 0 | | | 0 | | 1 : −4.34 |
| Reverse 3rd speed | | 0 | | 0 | | | 1 : −1.21 |

TABLE 2B

| A | B | S1 | C1 | X1 RG1 | P1 | P2 | S2 | C2 | X2 RG2 | P3 |
|---|---|---|---|---|---|---|---|---|---|---|
| F1 | N | 1.00 | −1.33 | −0.52 | −2.81 | 2.81 | −1.38 | 0.19 | 1.00 | 3.39 |
| | W | 0.0 | 0.0 | 0.0 | 0.0 | 0.0 | 0.0 | 0.00 | 0.00 | 0.00 |
| F2 | N | 1.00 | −1.15 | −0.38 | −2.54 | 2.54 | −1.15 | 0.26 | 1.00 | 3.06 |
| | W | 0.0 | 0.0 | 0.0 | 0.0 | 0.0 | 0.0 | 0.00 | 0.00 | 0.00 |
| F3 | N | 1.00 | −0.56 | 0.0 | −1.85 | 1.85 | −0.56 | 0.47 | 1.00 | 2.23 |
| | W | 1.15 | 2.30 | 1.15 | 1.15 | 1.15 | 1.41 | 2.83 | 1.41 | 1.41 |
| F4 | N | 1.00 | 0.0 | 0.36 | −1.18 | 1.18 | 0.0 | 0.66 | 1.00 | 1.43 |
| | W | 0.0 | 0.0 | 0.0 | 0.0 | 0.0 | 1.00 | 2.00 | 1.00 | 1.00 |
| R1 | N | −0.73 | 1.00 | 0.38 | 2.04 | −2.04 | 1.00 | −0.14 | −0.73 | −2.46 |
| | W | 0.0 | 0.0 | 0.0 | 0.0 | 0.0 | 1.92 | 3.85 | 1.92 | 1.92 |
| R2 | N | −0.87 | 1.00 | 0.33 | 2.21 | −2.21 | 1.00 | −0.25 | −0.87 | −2.67 |
| | W | 0.0 | 0.0 | 0.0 | 0.0 | 0.0 | 1.92 | 3.85 | 1.92 | 1.92 |
| R3 | N | −1.78 | 1.00 | 0.0 | 3.28 | −3.28 | 1.00 | −0.83 | −1.78 | −3.96 |
| | W | 2.21 | 4.42 | 2.21 | 2.21 | 2.21 | 0.80 | 1.59 | 0.80 | 0.80 |

| A | B | S3 | C2 | X3 RG3 | P4 | S4 | C4 | X4 RG4 | P5 |
|---|---|---|---|---|---|---|---|---|---|
| F1 | N | 1.00 | 0.19 | −0.11 | −0.01 | 0.19 | 0.00 | −0.11 | −0.48 |
| | W | 2.78 | 5.56 | 2.78 | 2.78 | 2.78 | 5.56 | 2.78 | 2.78 |
| F2 | N | 1.00 | 0.26 | 0.0 | −0.83 | 0.26 | 0.10 | 0.0 | −0.43 |
| | W | 2.78 | 5.56 | 2.78 | 2.78 | 0.0 | 0.0 | 0.0 | 0.0 |
| F3 | N | 1.00 | 0.47 | 0.27 | −0.60 | 0.47 | 0.34 | 0.27 | −0.32 |
| | W | 0.00 | 0.0 | 0.0 | 0.0 | 0.0 | 0.0 | 0.0 | 0.0 |
| F4 | N | 1.00 | 0.66 | 0.53 | −0.38 | 0.66 | 0.58 | 0.53 | −0.20 |
| | W | 0.00 | 0.0 | 0.0 | 0.0 | 0.0 | 0.0 | 0.0 | 0.0 |
| R1 | N | −0.73 | −0.14 | 0.08 | 0.66 | −0.14 | 0.0 | 0.08 | 0.35 |
| | W | 5.34 | 10.68 | 5.34 | 5.34 | 5.34 | 10.68 | 5.34 | 5.34 |
| R2 | N | −0.87 | −0.23 | 0.0 | 0.72 | −0.23 | −0.08 | 0.0 | 0.38 |
| | W | 5.34 | 10.68 | 5.34 | 5.34 | 0.0 | 0.0 | 0.0 | 0.0 |
| R3 | N | −1.78 | −0.83 | −0.49 | 1.07 | −0.83 | −0.61 | −0.49 | 0.56 |
| | W | 0.00 | 0.0 | 0.0 | 0.0 | 0.0 | 0.0 | 0.0 | 0.0 |

Figure 4:
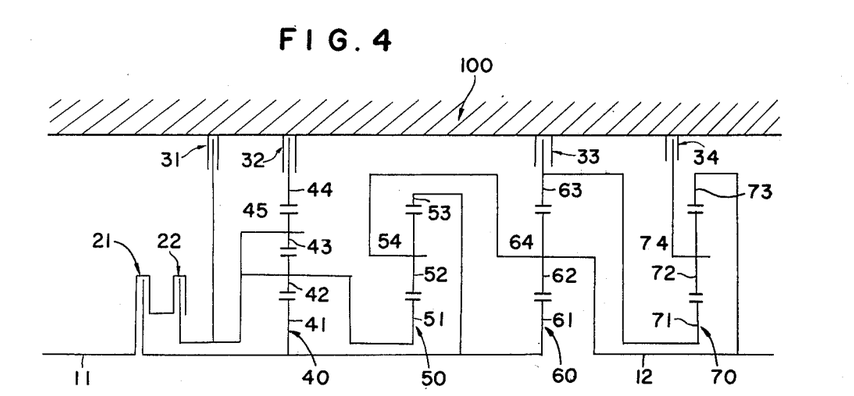
FIG. 4 is a view similar to that of FIG. 1 showing however a fourth embodiment of a speed change gear system of the present invention.

Referring now to FIG. 4 there is schematically shown a fourth embodiment of the present invention wherein an input shaft 11 and an output shaft 12 have interposed therebetween a first planetary gear set, generally indicated by the reference character 40, of the double pinion type, and second, third, and fourth planetary gear sets, generally indicated by the reference characters 50, 60 and 70 of the single pinion type.

The first planetary gear set 40 comprises a first sun gear 41, a first planetary gear 42 engaged with the first sun gear 41, a second planetary gear 43 engaged with the first planetary gear 42, a first ring gear 44 engaged with the second planetary gear 43, and a first carrier 45 rotatably supporting the first and second planetary gears 42 and 43. The second planetary gear set 50 comprises a second sun gear 51 drivingly coupled to the first carrier 45, a third planetary gear 52 engaged with the second sun gear 51, a second ring gear 53 engaged with the third planetary gear 52, and a second carrier 54 rotatably supporting the third planetary gear 52.

The third planetary gear set 60 similarly comprises a third sun gear 61 drivingly coupled to the first sun gear 41 and to the second ring gear 53, a fourth planetary gear 62 engaged with the third sun gear 61, a third ring gear 63 engaged with the fourth planetary gear 62, and a third carrier 64 rotatably supporting the fourth planetary gear 62, while the fourth planetary gear set 70 comprises a fourth sun gear 71 drivingly coupled to the third ring gear 63, a fifth planetary gear 72 engaged with the fourth sun gear 71, a fourth ring gear 73 engaged with the fifth planetary gear 72 and drivingly coupled to the second and third carriers 54 and 64 and to the output shaft 12, and a fourth carrier 74 rotatably supporting the fifth planetary gear 72.

A first clutch 21 is disposed so as to be capable of coupling or uncoupling the input shaft 11 to or from the first sun gear 41, the second ring gear 53 and the third sun gear 61 while a second clutch 22 is disposed so as to be capable of coupling or uncoupling the input shaft 11 to or from the first carrier 45 and the second sun gear 51. A first brake 31 is also disposed so as to be capable of locking the first carrier 45 and the second sun gear 51 relative to the casing 100 while a second brake 32 is similarly disposed so as to be capable of locking the second ring gear 44 relative to the casing 100. A third brake 33 is also provided so as to be capable of locking the third ring gear 63 and the fourth sun gear 71 relative to the casing 100 and a fourth brake 34 is likewise disposed so as to be capable of locking the fourth carrier 74 relative to the casing 100.

Within this embodiment, the radial ratios calculated in a manner similar to that of the first embodiment for each speed range: $I_1 = 0.36-$, $I_2 = 0.520$, $I_3 = 0.360$, and $I_4 = 0.562$. Table 3a shows the gear ratios within the individual speed ranges, five forward speed ranges and three reverse speed ranges, in connection with the operation of clutches 21 and 22, a brakes 31, 32, 33 and 34 while Table 3b shows the relationship between the number of revolutions and the tangential force of each element of the planetary gear set within each speed range.

TABLE 3a

| Speed Ranges | 21 | 22 | 31 | 32 | 33 | 34 | Gear Ratios |
|---|---|---|---|---|---|---|---|
| First speed | 0 | | | | | 0 | 1 : 8.72 |
| Second speed | 0 | | | | 0 | | 1 : 3.78 |
| Third speed | 0 | | | 0 | | | 1 : 2.15 |
| Fourth speed | 0 | | 0 | | | | 1 : 1.52 |
| Fifth speed | 0 | 0 | | | | | 1 : 1.00 |
| Reverse 1st speed | | 0 | | | | 0 | 1 : −13.85 |
| Reverse 2nd speed | | 0 | | | 0 | | 1 : −4.34 |
| Reverse 3rd speed | | 0 | | 0 | | | 1 : −1.21 |

TABLE 3B

| A | B | S1 | C1 | X1 RG1 | P1 | P2 | S2 | C2 | X2 RG2 | P3 |
|---|---|---|---|---|---|---|---|---|---|---|
| F1 | N | 1.00 | −1.59 | −0.66 | −3.06 | 3.06 | −1.59 | 0.11 | 1.00 | 3.69 |
|  | W | 0.0 | 0.0 | 0.0 | 0.0 | 0.0 | 0.0 | 0.0 | 0.00 | 0.00 |
| F2 | N | 1.00 | −1.15 | −0.38 | −2.54 | 2.54 | −1.15 | 0.26 | 1.00 | 3.06 |
|  | W | 0.0 | 0.0 | 0.0 | 0.0 | 0.0 | 0.0 | 0.00 | 0.00 | 0.00 |
| F3 | N | 1.00 | −0.56 | 0.0 | −1.85 | 1.85 | −0.56 | 0.47 | 1.00 | 2.23 |
|  | W | 1.15 | 2.30 | 1.15 | 1.15 | 1.15 | 1.41 | 2.83 | 1.41 | 1.41 |
| F4 | N | 1.00 | 0.0 | 0.36 | −1.18 | 1.18 | 0.0 | 0.66 | 1.00 | 1.43 |
|  | W | 0.0 | 0.0 | 0.0 | 0.0 | 0.0 | 1.00 | 2.00 | 1.00 | 1.00 |
| R1 | W | −0.63 | 1.00 | 0.41 | 1.93 | −1.93 | 1.00 | −0.07 | −0.63 | −2.32 |
|  | W | 0.0 | 0.0 | 0.0 | 0.0 | 0.0 | 1.92 | 3.85 | 1.92 | 1.92 |
| R2 | N | −0.87 | 1.00 | 0.33 | 2.21 | −2.21 | 1.00 | −0.23 | −0.87 | −2.67 |
|  | W | 0.0 | 0.0 | 0.0 | 0.0 | 0.0 | 1.92 | 3.85 | 1.92 | 1.92 |
| R3 | N | −1.78 | 1.00 | 0.0 | 3.28 | −3.28 | 1.00 | −0.83 | −1.78 | −3.96 |
|  | W | 2.21 | 4.42 | 2.21 | 2.21 | 2.21 | 0.80 | 1.59 | 0.80 | 0.80 |

| A | B | S3 | C2 | X3 RG3 | P4 | S4 | C4 | X4 RG4 | P5 |
|---|---|---|---|---|---|---|---|---|---|
| F1 | N | 1.00 | 0.11 | −0.20 | −1.00 | −0.20 | −0.00 | 0.11 | 0.52 |
|  | W | 2.78 | 5.56 | 2.78 | 2.78 | 4.94 | 9.89 | 4.94 | 4.94 |
| F2 | N | 1.00 | 0.26 | 0.0 | −0.83 | 0.0 | 0.17 | 0.26 | 0.43 |
|  | W | 2.78 | 5.56 | 2.78 | 2.78 | 0.0 | 0.0 | 0.0 | 0.0 |
| F3 | N | 1.00 | 0.47 | 0.27 | −0.60 | 0.27 | 0.40 | 0.47 | 0.32 |
|  | W | 0.00 | 0.0 | 0.0 | 0.0 | 0.0 | 0.0 | 0.0 | 0.0 |
| F4 | N | 1.00 | 0.66 | 0.53 | −0.38 | 0.53 | 0.61 | 0.66 | 0.20 |
|  | W | 0.00 | 0.0 | 0.0 | 0.0 | 0.0 | 0.0 | 0.0 | 0.0 |
| R1 | N | −0.63 | −0.07 | 0.13 | 0.63 | 0.13 | 0.00 | −0.07 | −0.33 |
|  | W | 5.34 | 10.68 | 5.34 | 5.34 | 9.51 | 19.01 | 9.51 | 9.51 |
| R2 | N | −0.87 | −0.23 | 0.0 | 0.72 | 0.0 | −0.15 | −0.23 | −0.38 |
|  | W | 5.34 | 10.68 | 5.34 | 5.34 | 0.0 | 0.0 | 0.0 | 0.0 |
| R3 | N | −1.78 | −0.83 | −0.49 | 1.07 | −0.49 | −0.70 | −0.83 | −0.56 |
|  | W | 0.00 | 0.0 | 0.0 | 0.0 | 0.0 | 0.0 | 0.0 | 0.0 |

Figure 5:
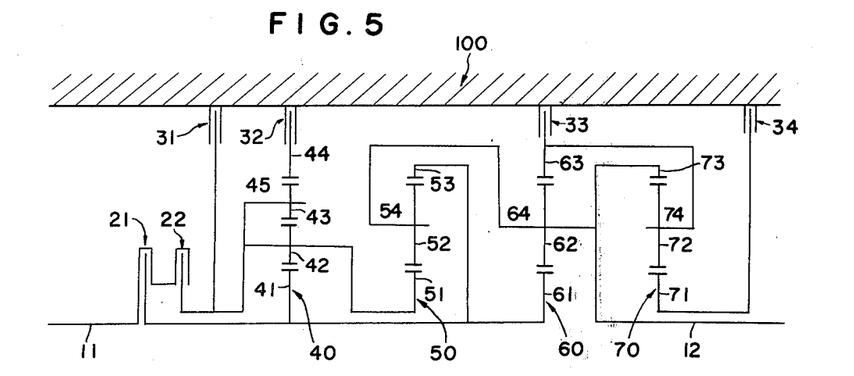
FIG. 5 is a view similar to that of FIG. 1 showing however a fifth embodiment of a speed change gear system of the present invention.

Referring now to FIG. 5, there is shown a schematic diagram of a fifth embodiment constructed according to the present invention wherein an input shaft 11 and an output shaft 12 have interposed therebetween a first planetary gear set, generally indicated by the reference character 40, of the double pinion type, and second, third and fourth planetary gear sets, generally indicated by the reference characters 50, 60 and 70, of the single pinion type.

Within this embodiment, the first planetary gear set 40 comprises a first sun gear 41, a first planetary gear 42 engaged with the first sun gear 41, a second planetary gear 43 engaged with the first planetary gear 42, a first ring gear 44 engaged with the second planetary gear 43, and a first carrier 45 rotatably supporting the first and second planetary gears 42 and 43. The second planetary gear set 50 similarly comprises a second sun gear 51 drivingly coupled to the first carrier 45, a third planetary gear 52 engaged with the second sun gear 51, a second ring gear 53 engaged with the third planetary gear 52, and a second carrier 54 rotatably supporting the third planetary gear 52.

The third planetary gear set 60 comprises a third sun gear 61 drivingly coupled to the first sun gear 41 and to the second ring gear 53, a fourth planetary gear 62 engaged with the third sun gear 61, a third ring gear 63 engaged with the fourth planetary gear 62, and a third carrier 64 rotatably supporting the fourth planetary gear 62, while the fourth planetary gear set 70 comprises a fourth sun gear 71, a fifth planetary gear 72 intermeshed with the fourth sun gear 71, a fourth ring gear 73 intermeshed with the fifth planetary gear 72 and drivingly coupled to the second and third carriers 54 and 64 and to the output shaft 12, and a fourth carrier 74 rotatably supporting the fifth planetary gear 72 and drivingly coupled to the third ring gear 63.

A first clutch 21 is disposed so as to be capable of coupling or uncoupling the input shaft 11 to or from the first sun gear 41, the second ring gear 53 and the third sun gear 61 while a second clutch 22 is disposed so as to be capable of coupling or uncoupling the input shaft 11 to or from the first carrier 45 and the second sun gear 51. A first brake 31 is also provided so as to be capable of locking the first carrier 45 and the second sun gear 51 relative to the casing 100 while a second brake 32 is similarly disposed so as to be capable of locking the second ring gear 44 relative to the casing 100. A third brake 33 is also disposed so as to be capable of locking the third ring gear 63 and the fourth carrier 74 relative to the casing 100 and a fourth brake 34 provides locking engagement between the fourth sun gear 71 and casing 100.

Within this embodiment, the radial ratios calculated as in the first embodiment for each speed range are: $I_1 = 0.360$, $I_2 = 0.520$, $I_3 = 0.360$, and $I_4 = 0.562$. Table 4a shows the gear ratios within the individual speed ranges, five forward speed ranges and two reverse speed ranges, in connection with the operation of clutches 21 and 22, and brakes 31, 32, 33 and 34, and Table 4b shows the relationship regarding the number of revolutions and the tangential force of each element within the planetary gear set within each speed range.

TABLE 4a

| Speed Ranges | 21 | 22 | 31 | 32 | 33 | 34 | Gear Ratios |
|---|---|---|---|---|---|---|---|
| First speed | 0 | | | | 0 | | 1 : 3.78 |
| Second speed | 0 | | | 0 | | | 1 : 2.15 |
| Third speed | 0 | | | | | 0 | 1 : 2.00 |
| Fourth speed | 0 | 0 | | | | | 1 : 1.52 |
| Fifth speed | 0 | 0 | | | | | 1 : 1.00 |
| Reverse 1st speed | | 0 | | | 0 | | 1 : −4.34 |
| Reverse 2nd speed | | 0 | 0 | | | | 1 : −1.21 |

TABLE 4a-continued

| Speed Ranges | 21 | 22 | 31 | 32 | 33 | 34 | Gear Ratios |
|---|---|---|---|---|---|---|---|
| Reverse 3rd speed | | | 0 | | | 0 | 1 : −0.92 |

TABLE 4B

| A | B | S1 | C1 | X1 RG1 | P1 | P2 | S2 | C2 | X2 RG2 | P3 |
|---|---|---|---|---|---|---|---|---|---|---|
| F1 | N | 1.00 | −1.15 | −0.38 | −2.54 | 2.54 | −1.15 | 0.26 | 1.00 | 3.06 |
|    | W | 0.0 | 0.0 | 0.0 | 0.0 | 0.0 | 0.0 | 0.00 | 0.00 | 0.00 |
| F2 | N | 1.00 | −0.56 | 0.0 | −1.85 | 1.85 | −0.56 | 0.47 | 1.00 | 2.23 |
|    | W | 1.15 | 2.30 | 1.15 | 1.15 | 1.15 | 1.41 | 2.83 | 1.41 | 1.41 |
| F3 | N | 1.00 | −0.46 | 0.06 | −1.73 | 1.73 | −0.46 | 0.50 | 1.00 | 2.08 |
|    | W | 0.0 | 0.0 | 0.0 | 0.0 | 0.0 | 0.0 | 0.00 | 0.0 | 0.0 |
| F4 | N | 1.00 | 0.0 | 0.36 | −1.18 | 1.18 | 0.0 | 0.66 | 1.00 | 1.43 |
|    | W | 0.0 | 0.0 | 0.0 | 0.0 | 0.0 | 1.00 | 2.00 | 1.00 | 1.00 |
| R1 | N | −0.87 | 1.00 | 0.33 | 2.21 | −2.21 | 1.00 | −0.23 | −0.87 | −2.67 |
|    | W | 0.0 | 0.0 | 0.0 | 0.0 | 0.0 | 1.92 | 3.85 | 1.92 | 1.92 |
| R2 | N | −1.78 | 1.00 | 0.0 | 3.28 | −3.28 | 1.00 | −0.83 | −1.78 | −3.96 |
|    | W | 2.21 | 4.42 | 2.21 | 2.21 | 2.21 | 0.80 | 1.59 | 0.80 | 0.80 |
| R3 | N | −2.17 | 1.00 | −0.14 | 3.75 | −3.75 | 1.00 | −1.08 | −2.17 | −4.52 |
|    | W | 0.0 | 0.0 | 0.0 | 0.0 | 0.0 | 1.92 | 3.85 | 1.92 | 1.92 |

| A | B | S3 | X3 C2 | RG3 | P4 | S4 | C4 | X4 RG4 | P5 |
|---|---|---|---|---|---|---|---|---|---|
| F1 | N | 1.00 | 0.26 | 0.0 | −0.83 | 0.47 | 0.0 | 0.26 | 1.21 |
|    | W | 2.78 | 5.56 | 2.78 | 2.78 | 0.0 | 0.0 | 0.0 | 0.0 |
| F2 | N | 1.00 | 0.47 | 0.27 | −0.60 | −0.07 | 0.27 | 0.47 | 0.88 |
|    | W | 0.00 | 0.0 | 0.0 | 0.0 | 0.0 | 0.0 | 0.0 | 0.0 |
| F3 | N | 1.00 | 0.50 | 0.32 | −0.56 | 0.0 | 0.32 | 0.50 | 0.82 |
|    | W | 2.78 | 5.56 | 2.78 | 2.78 | 1.78 | 3.56 | 1.78 | 1.78 |
| F4 | N | 1.00 | 0.66 | 0.53 | −0.38 | 0.32 | 0.53 | 0.66 | 0.56 |
|    | W | 0.00 | 0.0 | 0.0 | 0.0 | 0.0 | 0.0 | 0.0 | 0.0 |
| R1 | N | −0.87 | −0.23 | 0.0 | 0.72 | 0.41 | 0.0 | −0.23 | −1.05 |
|    | W | 5.34 | 10.68 | 5.34 | 5.34 | 0.0 | 0.0 | 0.0 | 0.0 |
| R2 | N | −1.78 | −0.83 | −0.49 | 1.07 | 0.12 | −0.49 | −0.83 | −1.56 |
|    | W | 0.00 | 0.0 | 0.0 | 0.0 | 0.0 | 0.0 | 0.0 | 0.0 |
| R3 | N | −2.17 | −1.98 | −0.69 | 1.22 | 0.0 | −0.69 | −1.08 | −1.78 |
|    | W | 5.34 | 10.68 | 5.34 | 5.34 | 3.42 | 6.84 | 3.42 | 3.42 |

Figure 6:
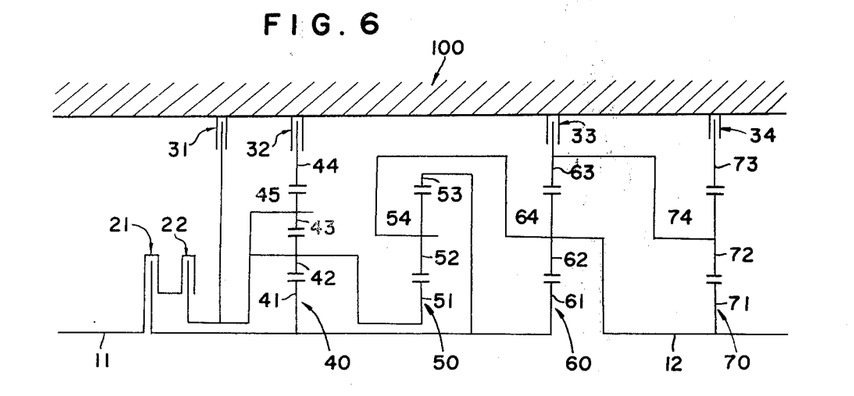
FIG. 6 is a view similar to that of FIG. 1 showing however a sixth embodiment of a speed change gear system of the present invention.

Turning now to FIG. 6, there is shown a schematic diagram of still a sixth embodiment of the present invention wherein an input shaft 22 and an output shaft 12 are connected by means of a first planetary gear set, generally indicated by the reference character 40 of the double pinion type, and second, third and fourth planetary gear sets, generally indicated by the reference characters 50, 60 and 70 of the single pinion type.

Similar to the previously described embodiments, the first planetary gear set 40 comprises a first sun gear 41, a first planetary gear 42 intermeshed with the first sun gear 41, a first ring gear 44 interengaged with the second planetary gear 43, and a first carrier 45 rotatably supporting the first and second planetary gears 42 and 43, and the second planetary gear set 50 comprises a second sun gear 51 drivingly coupled to the first carrier 45, a third planetary gear 52 engaged with the second sun gear 51, a second ring gear 53 enmeshed with the third planetary gear 52, and a second carrier 54 rotatably supporting the third planetary gear 52.

The third planetary gear set 60 is seen to comprise a third sun gear 61 drivingly coupled to the first sun gear 41 and to the second ring gear 53, a fourth planetary gear 62 engaged with the third sun gear 61, a third ring gear 63 intermeshed with the fourth planetary gear 62, and a third carrier 64 rotatably supporting the fourth planetary gear 62 while the fourth planetary gear set 70 comprises a fourth sun gear 71 drivingly coupled to the second and third carriers 54 and 64 and to the output shaft 12, a fifth planetary gear 72 enmeshed with the fourth sun gear 71, a fourth ring gear 73 engaged with the fifth planetary gear 72, and a fourth carrier 74 drivingly coupled to the third ring gear 63 and rotatably supporting the fifth planetary gear 72.

A first clutch 21 is disposed so as to be capable of coupling or uncoupling the input shaft 11 to or from the first sun gear 41, the second ring gear 53 and the third sun gear 61 while a second clutch 22 is disposed so as to be capable of coupling or uncoupling the input shaft 11 to or from the first carrier 45 and the second sun gear 51. A first brake 31 is provided so as to be capable of locking the first carrier 45 and the second sun gear 51 relative to the casing 100 and a second brake 32 is disposed so as to be capable of locking the first ring gear 44 relative to the casing 100. A third brake 33 is also provided so as to be capable of locking the third ring gear 63 and the fourth carrier 74 relative to casing 100 while a fourth brake 34 is similarly disposed so as to be capable of locking the fourth ring gear 73 relative to the casing 100.

Within this embodiment, the radial ratios calculated in a manner similar to that of the first embodiment for each speed range are: $I_1 = 0.360$, $I_2 = 0.520$, $I_3 = 0.360$, and $I_4 = 0.562$. Table 5a shows the gear ratios within the individual speed ranges, five forward speed ranges and three reverse speed ranges, in connection with the operations of clutches 21 and 22, and brakes 31, 32, 33 and 34, and Table 5b shows the relationship regarding the number of revolutions and the tangential force of each element of the planetary gear set within each speed range.

TABLE 5a

| Speed Ranges | 21 | 22 | 31 | 32 | 33 | 34 | Gear Ratios |
|---|---|---|---|---|---|---|---|
| First speed | 0 | | | | 0 | | 1 : 3.78 |
| Second speed | 0 | | | | | 0 | 1 : 2.78 |
| Third speed | 0 | | | 0 | | | 1 : 2.15 |
| Fourth speed | 0 | | 0 | | | | 1 : 1.52 |
| Fifth speed | 0 | 0 | | | | | 1 : 1.00 |
| Reverse 1st speed | | 0 | | | 0 | | 1 : −4.34 |
| Reverse 2nd speed | | 0 | | | | 0 | 1 : −2.42 |

TABLE 5a-continued

| Speed Ranges | 21 | 22 | 31 | 32 | 33 | 34 | Gear Ratios |
|---|---|---|---|---|---|---|---|
| Reverse 3rd speed | | 0 | | 0 | | | 1 : −1.21 |

TABLE 5B

| A | B | S1 | C1 | X1 RG1 | P1 | P2 | S2 | C2 | X2 RG2 | P3 |
|---|---|---|---|---|---|---|---|---|---|---|
| F1 | N | 1.00 | −1.15 | −0.38 | −2.54 | 2.54 | −1.15 | 0.26 | 1.00 | 3.06 |
|  | W | 0.0 | 0.0 | 0.0 | 0.0 | 0.0 | 0.0 | 0.00 | 0.00 | 0.00 |
| F2 | N | 1.00 | −0.87 | −0.20 | −2.21 | 2.21 | −0.87 | 0.36 | 1.00 | 2.67 |
|  | W | 0.0 | 0.0 | 0.0 | 0.0 | 0.0 | 0.0 | 0.00 | 0.00 | 0.00 |
| F3 | N | 1.00 | −0.56 | 0.0 | −1.85 | 1.85 | −0.56 | 0.47 | 1.00 | 2.23 |
|  | W | 1.15 | 2.30 | 1.15 | 1.15 | 1.15 | 1.41 | 2.83 | 1.41 | 1.41 |
| F4 | N | 1.00 | 0.0 | 0.36 | −1.18 | 1.18 | 0.0 | 0.66 | 1.00 | 1.43 |
|  | W | 0.0 | 0.0 | 0.0 | 0.0 | 0.0 | 1.00 | 2.00 | 1.00 | 1.00 |
| R1 | N | −0.87 | 1.00 | 0.33 | 2.21 | −2.21 | 1.00 | −0.23 | −0.87 | −2.67 |
|  | W | 0.0 | 0.0 | 0.0 | 0.0 | 0.0 | 1.92 | 3.85 | 1.92 | 1.92 |
| R2 | N | −1.15 | 1.00 | 0.23 | 2.54 | −2.54 | 1.00 | −0.41 | −1.15 | −3.06 |
|  | W | 0.0 | 0.0 | 0.0 | 0.0 | 0.0 | 1.92 | 3.85 | 1.92 | 1.92 |
| R3 | N | −1.78 | 1.00 | 0.0 | 3.28 | −3.28 | 1.00 | −0.83 | −1.78 | −3.96 |
|  | W | 2.21 | 4.42 | 2.21 | 2.21 | 2.21 | 0.80 | 1.59 | 0.80 | 0.80 |

| A | B | S3 | C2 | X3 RG3 | P4 | S4 | C4 | X4 RG4 | P5 |
|---|---|---|---|---|---|---|---|---|---|
| F1 | N | 1.00 | 0.26 | 0.0 | −0.83 | 0.26 | 0.00 | −0.15 | −0.68 |
|  | W | 2.78 | 5.56 | 2.78 | 2.78 | 0.0 | 0.0 | 0.0 | 0.0 |
| F2 | N | 1.00 | 0.36 | 0.13 | −0.72 | 0.36 | 0.13 | 0.0 | −0.59 |
|  | W | 2.78 | 5.56 | 2.78 | 2.78 | 1.78 | 3.56 | 1.78 | 1.78 |
| F3 | N | 1.00 | 0.47 | 0.27 | −0.60 | 0.47 | 0.27 | 0.16 | −0.49 |
|  | W | 0.00 | 0.0 | 0.0 | 0.0 | 0.0 | 0.0 | 0.0 | 0.0 |
| F4 | N | 1.00 | 0.66 | 0.53 | −0.38 | 0.66 | 0.53 | 0.47 | −0.32 |
|  | W | 0.00 | 0.0 | 0.0 | 0.0 | 0.0 | 0.0 | 0.0 | 0.0 |
| R1 | N | −0.87 | −0.23 | 0.0 | 0.72 | −0.23 | −0.00 | 0.13 | 0.59 |
|  | W | 5.34 | 10.68 | 5.34 | 5.34 | 0.0 | 0.0 | 0.0 | 0.0 |
| R2 | N | −1.15 | −0.41 | −0.15 | 0.83 | −0.41 | −0.15 | 0.0 | 0.68 |
|  | W | 5.34 | 10.68 | 5.34 | 5.34 | 3.42 | 6.84 | 3.42 | 3.42 |
| R3 | N | −1.78 | −0.83 | −0.49 | 1.07 | −0.83 | −0.49 | −0.29 | 0.88 |
|  | W | 0.00 | 0.0 | 0.0 | 0.0 | 0.0 | 0.0 | 0.0 | 0.0 |

Figure 7:
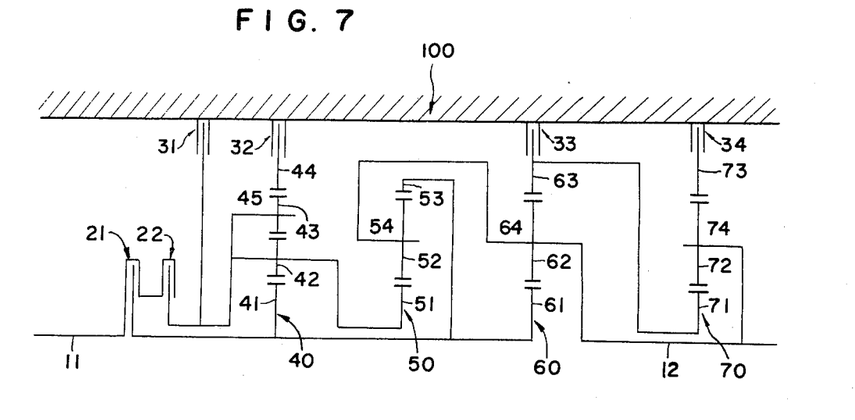
FIG. 7 is a view similar to that of FIG. 1 showing however a seventh embodiment of a speed change gear system of the present invention.

Reference is now made to FIG. 7, wherein there is shown a schematic diagram of a seventh embodiment of the present invention, an input shaft 11 and an output shaft 12 having interposed therebetween a first planetary gear set, generally indicated by the reference character 40, of the double pinion type, and second, third and fourth planetary gear sets, generally indicated by the reference characters 50, 60 and 70 of the single pinion type.

The first planetary gear set 40 includes a first sun gear 41, a first planetary gear 42 enmeshed with the first sun gear 41, a second planetary gear 43 interengaged with the first planetary gear 42, a first ring gear 44 engaged with the second planetary gear 43, and a first carrier 45 rotatably supporting the first and second planetary gears 42 and 43 and the second planetary gear set 50 comprises a second sun gear 51 drivingly coupled to the first carrier 45, a third planetary gear 52 engaged with the second sun gear 51, a second ring gear 53 enmeshed with the third planetary gear 52, and a second carrier 54 rotatably supporting the third planetary gear 52.

The third planetary gear set 60 similarly includes a third sun gear 61 drivingly coupled to the first sun gear 41 and to the second ring gear 53, a fourth planetary gear 62 interengaged with the third sun gear 61, a third ring gear 63 enmeshed with the fourth planetary gear 62, and a third carrier 64 rotatably supporting the fourth planetary gear 62 while the fourth planetary gear set comprises a fourth sun gear 71 drivingly coupled to the third ring gear 63, a fifth planetary gear 72 engaged with the fourth sun gear 71, a fourth ring gear 73 enmeshed with the fifth planetary gear 72, and a fourth carrier 74 drivingly coupled to the second and third carriers 54 and 64 and to the output shaft 12 and rotatably supporting the fifth planetary gear 72.

A first clutch 21 is disposed so as to be capable of coupling or uncoupling the input shaft 11 to or from the first sun gear 41, the second ring gear 53 and the third sun gear 61 and a second clutch 22 is similarly disposed so as to be capable of coupling or uncoupling the input shaft 11 to or from the first carrier 45 and the second sun gear 51. A first brake 31 is also provided so as to be capable of locking the first carrier 45 and the second sun gear 51 relative to the casing 100 and a second brake 32 is disposed so as to be capable of locking the first ring gear 44 relative to the casing 100. A third brake 33 is further provided so as to be capable of locking the third ring gear 63 and the fourth sun gear 71 relative to the casing 100 while still a fourth brake 34 is disposed so as to be capable of locking the fourth ring gear 73 relative to the casing 100.

Within this embodiment, the radial ratios calculated as in the case of the first embodiment within each speed range are: $I_1 = 0.360$, $I_2 = 0.520$, $I_3 = 0.360$, and $I_4 = 0.437$. Table 6a shows the gear ratios within the individual speed ranges, five forward speed ranges and three reverse speed ranges in connection with the operations of clutches 21 and 22, and brakes 31, 32, 33 and 34, while Table 6b shows the relationship regarding the number of revolutions and the tangential force of each element of the planetary gear set within each speed range.

TABLE 6a

| Speed Ranges | 21 | 22 | 31 | 32 | 33 | 34 | Gear Ratios |
|---|---|---|---|---|---|---|---|
| First speed | 0 | | | | | 0 | 1 : 13.22 |
| Second speed | 0 | | | 0 | | | 1 : 3.78 |
| Third speed | 0 | | 0 | | | | 1 : 2.15 |
| Fourth speed | 0 | 0 | | | | | 1 : 1.52 |
| Fifth speed | | 0 | 0 | | | | 1 : 1.00 |
| Reverse 1st speed | 0 | | | | 0 | | 1 : −5.36 |
| Reverse 2nd speed | | | | 0 | | 0 | 1 : −4.34 |
| Reverse 3rd speed | | | | 0 | 0 | | 1 : −1.21 |

TABLE 6B

| A | B | S1 | C1 | X1 RG1 | P1 | P2 | S2 | C2 | X2 RG2 | P3 |
|---|---|---|---|---|---|---|---|---|---|---|
| F1 | N | −0.41 | 1.00 | 0.49 | 1.66 | −1.66 | 1.00 | 0.08 | −0.41 | −2.00 |
|    | W | 0.0 | 0.0 | 0.0 | 0.0 | 0.0 | 1.92 | 3.85 | 1.92 | 1.92 |
| F2 | N | 1.00 | −1.15 | −0.38 | −2.54 | 2.54 | −1.15 | 0.26 | 1.00 | 3.06 |
|    | W | 0.0 | 0.0 | 0.0 | 0.0 | 0.0 | 0.0 | 0.00 | 0.00 | 0.00 |
| F3 | N | 1.00 | −0.56 | 0.0 | −1.85 | 1.85 | −0.56 | 0.47 | 1.00 | 2.23 |
|    | W | 1.15 | 2.30 | 1.15 | 1.15 | 1.15 | 1.41 | 2.83 | 1.41 | 1.41 |
| F4 | N | 1.00 | 0.0 | 0.36 | −1.18 | 1.18 | 0.0 | 0.66 | 1.00 | 1.43 |
|    | W | 0.0 | 0.0 | 0.0 | 0.0 | 0.0 | 1.00 | 2.00 | 1.00 | 1.00 |
| R1 | N | 1.00 | −2.47 | −1.22 | −4.10 | 4.10 | −2.47 | −0.19 | 1.00 | 4.94 |
|    | W | 0.0 | 0.0 | 0.0 | 0.0 | 0.0 | 0.0 | 0.0 | 0.0 | 0.0 |
| R2 | N | −0.87 | 1.00 | 0.33 | 2.21 | −2.21 | 1.00 | −0.23 | −0.87 | −2.67 |
|    | W | 0.0 | 0.0 | 0.0 | 0.0 | 0.0 | 1.92 | 3.85 | 1.92 | 1.92 |
| R3 | N | −1.78 | 1.00 | 0.0 | 3.28 | −3.28 | 1.00 | −0.83 | −1.78 | −3.96 |
|    | W | 2.21 | 4.42 | 2.21 | 2.21 | 2.21 | 0.80 | 1.59 | 0.80 | 0.80 |

| A | B | S3 | C2 | X3 RG3 | P4 | S4 | C4 | X4 RG4 | P5 |
|---|---|---|---|---|---|---|---|---|---|
|    |   | 0.0 | −0.27 −0.41 | 0.08 | 0.25 | 0.54 | 0.08 | 0.25 | 0.54 | 0.25 | 0.08 |
| F1 | W | 5.34 | 10.68 | 5.34 | 5.34 | 12.22 | 24.45 | 12.22 | 12.22 |
|    | N | 1.00 | 0.26 | 0.0 | −0.83 | 0.0 | 0.26 | 0.38 | 0.41 |
| F2 | W | 2.78 | 5.56 | 2.78 | 2.78 | 0.0 | 0.0 | 0.0 | 0.0 |
|    | N | 1.00 | 0.47 | 0.27 | −0.60 | 0.27 | 0.47 | 0.55 | 0.30 |
| F3 | W | 0.00 | 0.0 | 0.0 | 0.0 | 0.0 | 0.0 | 0.0 | 0.0 |
|    | N | 1.00 | 0.66 | 0.53 | −0.38 | 0.53 | 0.66 | 0.71 | 0.19 |
| F4 | W | 0.00 | 0.0 | 0.0 | 0.0 | 0.0 | 0.0 | 0.0 | 0.0 |
|    | N | 1.00 | −0.19 | −0.61 | −1.34 | −0.61 | −0.19 | 0.0 | 0.66 |
| R1 | W | 2.78 | 5.56 | 2.78 | 2.78 | 6.36 | 12.71 | 6.36 | 6.36 |
|    | N | −0.87 | −0.23 | 0.0 | 0.72 | 0.0 | −0.23 | −0.33 | −0.36 |
| R2 | W | 5.34 | 10.68 | 5.34 | 5.34 | 0.0 | 0.0 | 0.0 | 0.0 |
|    | N | −1.78 | −0.83 | −0.49 | 1.07 | −0.49 | −0.83 | −0.98 | −0.53 |
| R3 | W | 0.00 | 0.0 | 0.0 | 0.0 | 0.0 | 0.0 | 0.0 | 0.0 |

Figure 8:
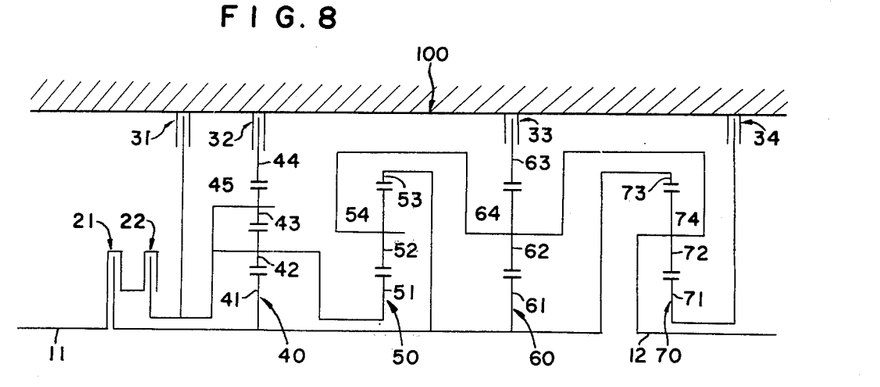
FIG. 8 is a view similar to that of FIG. 1 showing however an eighth embodiment of a speed change gear system of the present invention.

Referring now to FIG. 8, there is shown a schematic diagram of an eighth embodiment of the present invention wherein an input shaft 11 is connected to an output shaft 12 through means of a first planetary gear set, generally indicated by the reference character 40, of the double pinion type, and second, third and fourth planetary gear sets, generally indicated by the reference characters 50, 60 and 70 of the single pinion type.

The first planetary gear set 40 comprises a first sun gear 41, first planetary gear 42 enmeshed with the first sun gear 41, a second planetary gear 43 engaged with the first planetary gear 42, a first gear 44 interengaged with the second planetary gear 43, and a first carrier 45 rotatably supporting the first and second planetary gears 42 and 43. The second planetary gear set 50 similarly comprises a second sun gear 51 drivingly coupled to the first carrier 45, a third planetary gear 52 engaged with the second sun gear 51, a second ring gear 53 enmeshed with the third planetary gear 52, and a second carrier 54 rotatably supporting the third planetary gear 52.

The third planetary gear set 60 includes a third sun gear 61 drivingly coupled to the first sun gear 41 and to the second ring gear 53, a fourth planetary gear 62 interengaged with the third sun gear 61, a third ring gear 63 engaged with the fourth planetary gear 62, and a third carrier 64 rotatably supporting the fourth planetary gear 62, while the fourth planetary gear set 70 is provided with a fourth sun gear 71, a fifth planetary gear 72 engaged therewith, a fourth ring gear 73 enmeshed with the fifth planetary gear 72 and drivingly coupled to the third sun gear 61, and a fourth carrier 74 rotatably supporting the fifth planetary gear 72 and drivingly coupled to the second and third carriers 54 and 64 as well as to the output shaft 12.

A first clutch 21 is disposed so as to be capable of coupling or uncoupling the input shaft 11 to or from the first sun gear 41, the second ring gear 53, the third sun gear 61 and the fourth ring gear 73 while a second clutch 22 is similarly disposed so as to be capable of coupling or uncoupling the input shaft 11 to or from the first carrier 45 and the second sun gear 51. A first brake 31 is provided so as to be capable of locking the first carrier 45 and the second sun gear 51 relative to the casing 100 and a second brake 32 is also provided so as to be capable of locking the first ring gear 44 relative to the casing 100. A third brake 33 is further provided so as to be capable of locking the third ring gear 63 relative to the casing 100 while still a fourth brake 34 is disposed so as to be capable of locking the fourth sun gear 71 relative to the casing 100.

Within this embodiment, the radial ratios calculated as is the case within the first embodiment within each speed range are: $I_1 = 0.360$, $I_2 = 0.520$, $I_3 = 0.360$, and $I_4 = 0.280$. Table 7a shows the gear ratios within the individual speed ranges, six forward speed ranges and two reverse speed ranges, in connection with the operation of clutches 21, 22, and brakes 31, 32, 33 and 34 while Table 7b shows the relationship regarding the number of revolutions and the tangential force of each element of the planetary gear set within each speed range.

Figure 9:
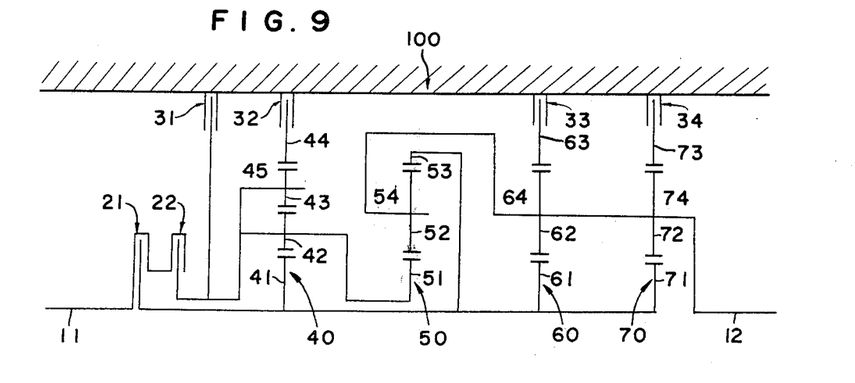
FIG. 9 is a view similar to that of FIG. 1 showing however a ninth embodiment of a speed change gear system of the present invention.

Reference is now made to FIG. 9, wherein there is shown still another schematic diagram of a ninth embodiment of the present invention as including an input shaft 11 and an output shaft 12, a first planetary gear set, generally indicated by the reference character 40, of the double pinion type, and second, third and fourth planetary gear sets, generally indicated by the reference characters 50, 60 and 70 being interposed therebetween.

The first planetary gear set 40 has a first sun gear 41, a first planetary gear 42 engaged therewith, a second planetary gear 43 interengaged with the first planetary gear 42, a first ring gear 44 enmeshed with the second planetary gear 43, and a first carrier 45 rotatably supporting the first and second planetary gears 42 and 43. The second planetary gear set 50 similarly comprises a first sun gear 51 drivingly coupled to the first carrier 45, a third planetary gear 52 engaged with the second sun gear 51, a second ring gear 53 enmeshed with the third planetary gear 52, and a second carrier 54 rotatably supporting the third planetary gear 52.

The third planetary gear set 60 includes a third sun gear 61 drivingly coupled to the first sun gear 41 and the second ring gear 53, a fourth planetary gear 62 engaged with the third sun gear 61, a third ring gear 63 enmeshed with the fourth planetary gear 62, and a third carrier 64 rotatably supporting the fourth planetary gear 62, while the fourth planetary gear set 70 comprises a fourth sun gear 71 drivingly coupled to the third sun gear 61, a fifth planetary gear 72 engaged with the fourth sun gear 71, a fourth ring gear 73 interengaged with the fifth planetary gear 72, and a fourth carrier 74 rotatably supporting the fifth planetary gear 72 and drivingly coupled to the second and third carriers 54 and 64 as well as to the output shaft 12.

A first clutch 21 is disposed so as to be capable of coupling or uncoupling the input shaft 11 to or from the first sun gear 41, the second ring gear 53, the third sun gear 61 and the fourth sun gear 71 while a second clutch 22 is similarly disposed so as to be capable of coupling or uncoupling the input shaft 11 to or from Table 7a

| Speed Ranges | 21 | 22 | 31 | 32 | 33 | 34 | Gear Ratios |
|---|---|---|---|---|---|---|---|
| First speed | 0 |   |   |   | 0 |   | 1 : 3.78 |
| Second speed | 0 |   |   | 0 |   |   | 1 : 2.15 |
| Third speed | 0 |   | 0 |   |   |   | 1 : 1.52 |
| Fourth speed | 0 |   |   |   |   | 0 | 1 : 1.28 |
| Fifth speed | 0 | 0 |   |   |   |   | 1 : 1.00 |
| Sixth speed |   | 0 |   |   |   | 0 | 1 : 0.46 |
| Reverse 1st speed |   | 0 |   |   | 0 |   | 1 : −4.34 |
| Reverse 2nd speed |   | 0 |   | 0 |   |   | 1 : −1.21 |

Table 7B

| A | B | S1 | C1 | X1 RG1 | P1 | P2 | S2 | C2 | X2 RG2 | P3 |
|---|---|---|---|---|---|---|---|---|---|---|
| F1 | N | −0.14 | 1.00 | 0.59 | 1.35 | −1.35 | 1.00 | 0.25 | −0.14 | −1.63 |
|    | W | 0.0 | 0.0 | 0.0 | 0.0 | 0.0 | 1.92 | 3.85 | 1.92 | 1.92 |
| F2 | N | 1.00 | −1.15 | −0.38 | −2.54 | 2.54 | −1.15 | 0.26 | 1.00 | 3.06 |
|    | W | 0.0 | 0.0 | 0.0 | 0.0 | 0.0 | 0.0 | 0.00 | 0.00 | 0.00 |
| F3 | N | 1.00 | −0.56 | 0.0 | −1.85 | 1.85 | −0.56 | 0.47 | 1.00 | 2.23 |
|    | W | 1.15 | 2.30 | 1.15 | 1.15 | 1.15 | 1.41 | 2.83 | 1.41 | 1.41 |
| F4 | N | 1.00 | 0.0 | 0.36 | −1.18 | 1.18 | 0.0 | 0.66 | 1.00 | 1.43 |
|    | W | 0.0 | 0.0 | 0.0 | 0.0 | 0.0 | 1.00 | 2.00 | 1.00 | 1.00 |
| R1 | N | −0.87 | 1.00 | 0.33 | 2.21 | −2.21 | 1.00 | −0.23 | −0.87 | −2.67 |
|    | W | 0.0 | 0.0 | 0.0 | 0.0 | 0.0 | 1.92 | 3.85 | 1.92 | 1.92 |
| R2 | N | −1.78 | 1.00 | 0.0 | 3.28 | −3.28 | 1.00 | −3.83 | −1.78 | −3.96 |
|    | W | 2.21 | 4.42 | 2.21 | 2.21 | 2.21 | 0.80 | 1.59 | 0.80 | 0.80 |

| A | B | S3 | C2 | X3 RG3 | P4 | S4 | C4 | X4 RG4 | P5 |
|---|---|---|---|---|---|---|---|---|---|
| F1 | N | −0.14 | 0.25 | 0.39 | 0.44 | 0.0 | 0.25 | 0.39 | 0.64 |
|    | W | 5.34 | 10.68 | 5.34 | 5.34 | 5.34 | 10.68 | 5.34 | 5.34 |
| F2 | N | 1.00 | 0.26 | 0.0 | −0.83 | 0.74 | 0.26 | 0.0 | −1.21 |
|    | W | 2.78 | 5.56 | 2.78 | 2.78 | 0.0 | 0.0 | 0.0 | 0.0 |
| F3 | N | 1.00 | 0.47 | 0.27 | −0.60 | 0.81 | 0.47 | 0.27 | −0.88 |
|    | W | 0.00 | 0.0 | 0.0 | 0.0 | 0.0 | 0.0 | 0.0 | 0.0 |
| F4 | N | 1.00 | 0.66 | 0.53 | −0.38 | 0.88 | 0.66 | 0.53 | −0.56 |
|    | W | 0.00 | 0.0 | 0.0 | 0.0 | 0.0 | 0.0 | 0.0 | 0.0 |
| R1 | N | −0.87 | −0.23 | 0.0 | 0.72 | −0.64 | −0.23 | 0.0 | 1.05 |
|    | W | 5.34 | 10.68 | 5.34 | 5.34 | 5.34 | 0.0 | 0.0 | 0.0 |
| R2 | N | −1.78 | −0.83 | −0.49 | 1.07 | −1.44 | −0.83 | −0.49 | 1.56 |
|    | W | 0.00 | 0.0 | 0.0 | 0.0 | 0.0 | 0.0 | 0.0 | 0.0 | the first carrier 45 and the second sun gear 51. A first brake 31 is provided so as to be capable of locking the first carrier 45 and the second sun gear 51 relative to the casing 100 while a second brake 32 is disposed so as to be capable of locking the first ring gear 44 relative to the casing 100. A third brake 33 is also provided for locking the third ring gear 63 relative to the casing 100 and a fourth brake 34 is similarly provided for locking the fourth ring gear 73 relative to the casing 100.

Within this embodiment, the radial ratios calculated in a manner similar to those ratios associated with the first embodiment within each speed range are: $I_1 = 0.360$, $I_2 = 0.520$, $I_3 = 0.360$, and $I_4 = 0.280$. Table 8a shows the gear ratios within the individual speed ranges, five forward speed ranges and three reverse speed ranges in connection with the operations of clutches 21, 22, and brakes 31, 32, 33 and 34, and Table 8b shows the relationship regarding the number of revolutions and the tangential force of each element of the planetary gear set within each speed range.

TABLE 8a

Figure 10:
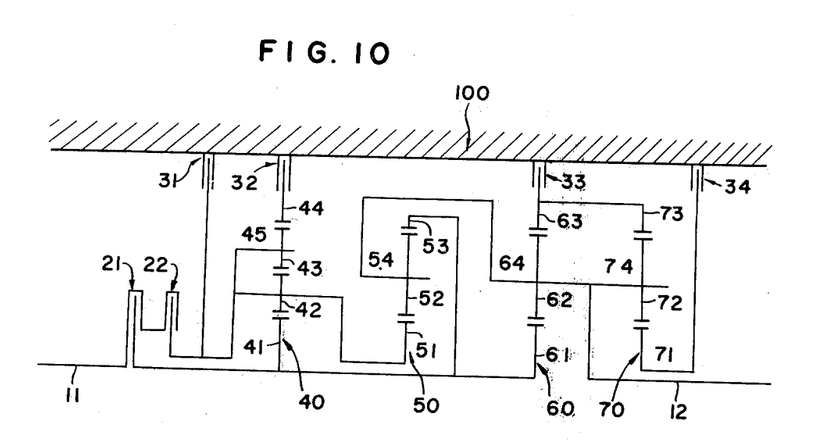
FIG. 10 is a view similar to that of FIG. 1 showing however a tenth embodiment of a speed change gear system of the present invention.

| Speed Ranges | 21 | 22 | 31 | 32 | 33 | 34 | Gear Ratios |
|---|---|---|---|---|---|---|---|
| First speed | 0 | | | | | 0 | 1 : 4.57 |
| Second speed | 0 | | | | 0 | | 1 : 3.78 |
| Third speed | 0 | | | 0 | | | 1 : 2.15 |
| Fourth speed | 0 | | 0 | | | | 1 : 1.52 |
| Fifth speed | 0 | 0 | | | | | 1 : 1.00 |
| Reverse 1st speed | | 0 | | | | 0 | 1 : −5.87 |
| Reverse 2nd speed | | 0 | | | 0 | | 1 : −4.34 |
| Reverse 3rd speed | | 0 | | 0 | | | 1 : −1.21 | indicated by the reference characters 50, 60 and 70, of the single pinion type being suitably interposed therebetween.

The first planetary gear set 40 comprises a first sun gear 41, a first planetary gear 42 engaged therewith, a second planetary gear 43 enmeshed with the first planetary gear 42, a first ring gear 44 interengaged with the second planetary gear 43, and a first carrier 45 rotatably supporting the first and second planetary gears 42 and 43, while the second planetary gear set 50 similarly comprises a second sun gear 51 drivingly coupled to the first carrier 45, a third planetary gear 52 engaged with the second sun gear 51, a second ring gear 53 enmeshed with the third planetary gear 52, and a second carrier 54 rotatably supporting the third planetary gear 52.

The third planetary gear set 60 includes a third sun gear 61 drivingly coupled to the first sun gear 41 and to the second ring gear 53, a fourth planetary gear 62 engaged with the third sun gear 61, a third ring gear 63 enmeshed with the fourth planetary gear 62, and a third carrier 64 rotatably supporting the fourth planetary gear 62, and the fourth planetary gear set 70 is seen to comprise a fourth sun gear 71, a fifth planetary gear 72 engaged therewith, a fourth ring gear 73 enmeshed with the fifth planetary gear 72 and drivingly coupled to the third ring gear 63, and a fourth carrier 74 rotatably supporting the fifth planetary gear 72 and drivingly coupled to the second and third carriers 54 and 64 as well as to the output shaft 12.

A first clutch 21 is disposed so as to be capable of

TABLE 8B

| A | B | S1 | C1 | X1 RG1 | P1 | P2 | S2 | X2 C2 | RG2 | P3 |
|---|---|---|---|---|---|---|---|---|---|---|
| F1 | N | 1.00 | −1.15 | −0.38 | −2.54 | 2.54 | −1.15 | 0.26 | 1.00 | 3.06 |
| | W | 0.0 | 0.0 | 0.0 | 0.0 | 0.0 | 0.0 | 0.0 | 0.00 | 0.00 |
| F2 | N | 1.00 | −0.56 | 0.0 | −1.85 | 1.85 | −0.56 | 0.47 | 1.00 | 2.23 |
| | W | 1.15 | 2.30 | 1.15 | 1.15 | 1.15 | 1.41 | 2.83 | 1.41 | 1.41 |
| F3 | N | 1.00 | 0.0 | 0.36 | −1.18 | 1.18 | 0.0 | 0.66 | 1.00 | 1.43 |
| | W | 0.0 | 0.0 | 0.0 | 0.0 | 0.0 | 1.00 | 2.00 | 1.00 | 1.00 |
| F4 | N | 1.00 | 0.36 | 0.59 | −0.76 | 0.76 | 0.36 | 0.78 | 1.00 | 0.91 |
| | W | 0.0 | 0.0 | 0.0 | 0.0 | 0.0 | 0.0 | 0.00 | 0.00 | 0.00 |
| F5 | N | 2.77 | 1.00 | 1.64 | −2.10 | 2.10 | 1.00 | 2.17 | 2.77 | 2.53 |
| | W | 0.00 | 0.0 | 0.0 | 0.0 | 0.0 | 1.92 | 3.85 | 1.92 | 1.92 |
| R1 | N | −0.87 | 1.00 | 0.33 | 2.21 | −2.21 | 1.00 | −0.23 | −0.87 | −2.67 |
| | W | 0.0 | 0.0 | 0.0 | 0.0 | 0.0 | 1.92 | 3.85 | 1.92 | 1.92 |
| R2 | N | −1.78 | 1.00 | 0.0 | 3.28 | −3.28 | 1.00 | −0.83 | −1.78 | −3.96 |
| | W | 2.21 | 4.42 | 2.21 | 2.21 | 2.21 | 0.80 | 1.59 | 0.80 | 0.80 |

| A | B | S3 | X3 C2 | RG3 | P4 | S4 | X4 C4 | RG4 | P5 |
|---|---|---|---|---|---|---|---|---|---|
| F1 | N | 1.00 | 0.26 | 0.0 | −0.83 | −2.36 | 0.26 | 1.00 | 2.04 |
| | W | 2.78 | 5.56 | 2.78 | 2.78 | 0.0 | 0.00 | 0.00 | 0.00 |
| F2 | N | 1.00 | 0.47 | 0.27 | −0.60 | −1.44 | 0.47 | 1.00 | 1.48 |
| | W | 0.00 | 0.0 | 0.0 | 0.0 | 0.0 | 0.00 | 0.00 | 0.00 |
| F3 | N | 1.00 | 0.66 | 0.53 | −0.38 | −0.56 | 0.66 | 1.00 | 0.95 |
| | W | 0.00 | 0.0 | 0.0 | 0.0 | 0.0 | 0.00 | 0.00 | 0.00 |
| F4 | N | 1.00 | 0.78 | 0.70 | −0.25 | 0.0 | 0.78 | 1.00 | 0.61 |
| | W | 0.00 | 0.0 | 0.0 | 0.0 | 1.00 | 2.00 | 1.00 | 1.00 |
| F5 | N | 2.77 | 2.17 | 1.95 | −0.68 | 0.0 | 2.17 | 2.77 | 1.69 |
| | W | 0.0 | 0.0 | 0.0 | 0.0 | 1.92 | 3.85 | 1.92 | 1.92 |
| R1 | N | −0.87 | −0.23 | 0.0 | 0.72 | 2.05 | −0.23 | −0.87 | −1.78 |
| | W | 5.34 | 10.68 | 5.34 | 5.34 | 0.0 | 0.00 | 0.00 | 0.00 |
| R2 | N | −1.78 | −0.83 | −0.49 | 1.07 | 2.57 | −0.83 | −1.73 | −2.64 |
| | W | 0.00 | 0.0 | 0.0 | 0.0 | 0.0 | 0.00 | 0.00 | 0.00 |

Referring now to FIG. 10, there is shown a schematic diagram of still a tenth embodiment of the present invention wherein the numeral 11 denotes an input shaft, and the numeral 12 denotes an output shaft, a first planetary gear set, generally indicated by the reference character 40 of the double pinion type, and second, third, and fourth planetary gear sets, generally coupling or uncoupling the input shaft 11 to or from the first sun gear 41, the second ring gear 53 and the third sun gear 61 while a second clutch 22 is similarly disposed so as to be capable of coupling or uncoupling the input shaft 11 to or from the first carrier 45 and the second sun gear 51. A first brake 31 is provided for locking the first carrier 45 and the second sun gear 51 relative to the casing 100 while a second brake 32 is also provided for locking the first ring gear 44 relative to the casing 100. Still a third brake 33 is provided for locking the third ring gear 63 and the fourth ring gear 73 relative to the casing 100 and a fourth brake 34 is also provided for locking the fourth sun gear 71 relative to the casing 100.

Within this embodiment, the radial ratios calculated as in the first embodiment within each speed reange are: $I_1 = 0.360$, $I_2 = 0.520$, $I_3 = 0.360$, and $I_4 = 0.562$, Table 9a showing the gear ratios within the individual speed ranges, five forward speed ranges and two reverse speed ranges, in connection with the operations of clutches 21 and 22, and brakes 31, 32, 33 and 34, while Table 9b shows the relationship regarding the number of revolutions and the tangential force of each element of the planetary gear set within each speed range.

TABLE 9a

| Speed Ranges | 21 | 22 | 31 | 32 | 33 | 34 | Gear Ratios |
|---|---|---|---|---|---|---|---|
| First speed |  |  | 0 |  |  | 0 | 1 : 4.00 |
| Second speed | 0 |  |  |  | 0 |  | 1 : 3.78 |
| Third speed | 0 |  |  | 0 |  |  | 1 : 2.15 |
| Fourth speed | 0 |  | 0 |  |  |  | 1 : 1.52 |
| Fifth speed | 0 | 0 |  |  |  |  | 1 : 1.00 |
| Reverse 1st speed |  | 0 |  |  | 0 |  | 1 : −4.34 |
| Reverse 2nd speed |  | 0 |  | 0 |  |  | 1 : −1.21 |

TABLE 9B

| A | B | S1 | C1 | X1 RG1 | P1 | P2 | S2 | C2 | X2 RG2 | P3 |
|---|---|---|---|---|---|---|---|---|---|---|
| F1 | N | 1.00 | −1.28 | −0.46 | −2.70 | 2.70 | −1.28 | 0.22 | 1.00 | 3.26 |
|  | W | 0.0 | 0.0 | 0.0 | 0.0 | 0.0 | 0.0 | 0.00 | 0.00 | 0.00 |
| F2 | N | 1.00 | −1.15 | −0.38 | −2.54 | 2.54 | −1.15 | 0.26 | 1.00 | 3.06 |
|  | W | 0.0 | 0.0 | 0.0 | 0.0 | 0.0 | 0.0 | 0.00 | 0.00 | 0.00 |
| F3 | N | 1.00 | −0.56 | 0.0 | −1.85 | 1.85 | −0.56 | 0.47 | 1.00 | 2.23 |
|  | W | 1.15 | 2.30 | 1.15 | 1.15 | 1.15 | 1.41 | 2.83 | 1.41 | 1.41 |
| F4 | N | 1.00 | 0.0 | 0.36 | −1.18 | 1.18 | 0.0 | 0.66 | 1.00 | 1.43 |
|  | W | 0.0 | 0.0 | 0.0 | 0.0 | 0.0 | 1.00 | 2.00 | 1.00 | 1.00 |
| R1 | N | −0.78 | 1.00 | 0.36 | 2.10 | −2.10 | 1.00 | −0.17 | −0.78 | −2.54 |
|  | W | 0.0 | 0.0 | 0.0 | 0.0 | 0.0 | 1.92 | 3.85 | 1.92 | 1.92 |
| R2 | N | −0.87 | 1.00 | 0.33 | 2.21 | −2.21 | 1.00 | −0.23 | −0.87 | −2.67 |
|  | W | 0.0 | 0.0 | 0.0 | 0.0 | 0.0 | 1.92 | 3.85 | 1.92 | 1.92 |
| R3 | N | −1.78 | 1.00 | 0.0 | 3.28 | −3.28 | 1.00 | −0.83 | −1.78 | −3.96 |
|  | W | 2.21 | 4.42 | 2.21 | 2.21 | 2.21 | 0.80 | 1.59 | 0.80 | 0.80 |

| A | B | S3 | C2 | X3 RG3 | P4 | S4 | C4 | X4 RG4 | P5 |
|---|---|---|---|---|---|---|---|---|---|
| F1 | N | 1.00 | 0.22 | −0.06 | −0.88 | 1.00 | 0.22 | 0.0 | −0.61 |
|  | W | 0.0 | 0.0 | 0.0 | 0.0 | 3.57 | 7.14 | 3.57 | 3.57 |
| F2 | N | 1.00 | 0.26 | 0.0 | −0.83 | 1.00 | 0.26 | 0.06 | −0.57 |
|  | W | 2.78 | 5.56 | 2.78 | 2.78 | 0.0 | 0.0 | 0.0 | 0.0 |
| F3 | N | 1.00 | 0.47 | 0.27 | −0.60 | 1.00 | 0.47 | 0.32 | −0.42 |
|  | W | 0.0 | 0.0 | 0.0 | 0.0 | 0.00 | 0.0 | 0.0 | 0.0 |
| F4 | N | 1.00 | 0.66 | 0.53 | −0.38 | 1.00 | 0.66 | 0.56 | −0.27 |
|  | W | 0.0 | 0.0 | 0.0 | 0.0 | 0.00 | 0.0 | 0.0 | 0.0 |
| R1 | N | −0.78 | −0.17 | 0.05 | 0.68 | −0.78 | −0.17 | 0.0 | 0.47 |
|  | W | 0.0 | 0.0 | 0.0 | 0.0 | 6.87 | 13.74 | 6.87 | 6.87 |
| R2 | N | −0.87 | −0.23 | 0.0 | 0.72 | −0.87 | −0.23 | −0.05 | 0.50 |
|  | W | 5.34 | 10.68 | 5.34 | 5.34 | 0.0 | 0.0 | 0.0 | 0.0 |
| R3 | N | −1.78 | −0.83 | −0.49 | 1.07 | −1.78 | −0.83 | −0.56 | 0.74 |
|  | W | 0.0 | 0.0 | 0.0 | 0.0 | 0.00 | 0.0 | 0.0 | 0.0 |

According to the present invention then, there has been disclosed and described a speed change gearing system capable of changing speeds between at least four forward speeds and one reverse speed, of which the speed change gearing system of this invention will no doubt contribute greatly to the development of mechanized industry.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. A speed change gear comprising;

first, second and third planetary gear sets suitably interposed between an input shaft and an output shaft;

said first planetary gear set including a first sun gear, a first planetary gear engaged with said first sun gear, a second planetary gear engaged with said first planetary gear, a first ring gear engaged with said second planetary gear, and a first carrier rotatably supporting said first and second planetary gears;

said second planetary gear set includes a second sun gear drivingly coupled to said first carrier, a third planetary gear engaged with said second sun gear, a second ring gear enmeshed with said third planetary gear, and a second carrier rotatably supporting said third planetary gear;

said third planetary gear set includes a third sun gear drivingly coupled to said first sun gear and to said second ring gear, a fourth planetary gear interengaged with said third sun gear, a third ring gear engaged with said fourth planetary gear, and a third carrier rotatably supporting said fourth planetary gear and drivingly coupled to said second carrier and to said output shaft;

a first clutch for coupling or uncoupling said input shaft to or from said first sun gear, said second ring gear and said third sun gear;

a second clutch for coupling or uncoupling said input shaft to or from said first carrier and said second sun gear;

a second brake means capable of being actuated for locking said first ring gear to said casing; and a third brake means capable of being actuated for locking said third ring gear to said casing.

* * * * *